United States Patent [19]
Swartz

[11] Patent Number: 4,791,628
[45] Date of Patent: Dec. 13, 1988

[54] HIGH-SPEED DEMULTIPLEXER CIRCUIT

[75] Inventor: Robert G. Swartz, Tinton Falls, N.J.

[73] Assignee: American Telephone and Telegraph Company, AT&T Bell Labs, Murray Hill, N.J.

[21] Appl. No.: 109,009

[22] Filed: Oct. 16, 1987

[51] Int. Cl.$^4$ .............................................. H04J 3/02
[52] U.S. Cl. ..................................... 370/112; 328/105
[58] Field of Search ...................... 370/112; 307/244; 328/104, 105

[56] References Cited

U.S. PATENT DOCUMENTS 3,921,079 11/1975 Heffner et al. ..................... 328/105
4,317,198 2/1982 Johnson ............................... 370/84

OTHER PUBLICATIONS

H. M. Rein and R. Reimann, "6Gbit/s Multiplexer and Regenerating Demultiplexer ICs for Optical Transmission Systems Based on a Standard Bipolar Technology", *Electronics Letters*, vol. 22, No. 19, Sep. 11, 1986, pp. 988–990.

*Primary Examiner*—Douglas W. Olms
*Assistant Examiner*—Min Jung
*Attorney, Agent, or Firm*—John A. Caccuro

[57] ABSTRACT

A demultiplexer for demultiplexing a multiplexed input data signal into M output channels using M sequencer means clocked from an overlapping M phase system clock. The system clock operates at a frequency equal to the input data signal rate divided by M. Each sequencer means is clocked by a unique combination of the M phase system clock signals to select one data channel from the multiplexed input data signal. Since all sequencer means circuits are synchronized to the system clock, no variable delay lines are needed to align the timing between the circuit stages. A time delay latch is provided where needed in each sequencer means to enable all channels to output data concurrently. The demultiplexer includes a real-time data-framing capability to assure that the input data is correctly mapped to the proper output channels.

9 Claims, 5 Drawing Sheets

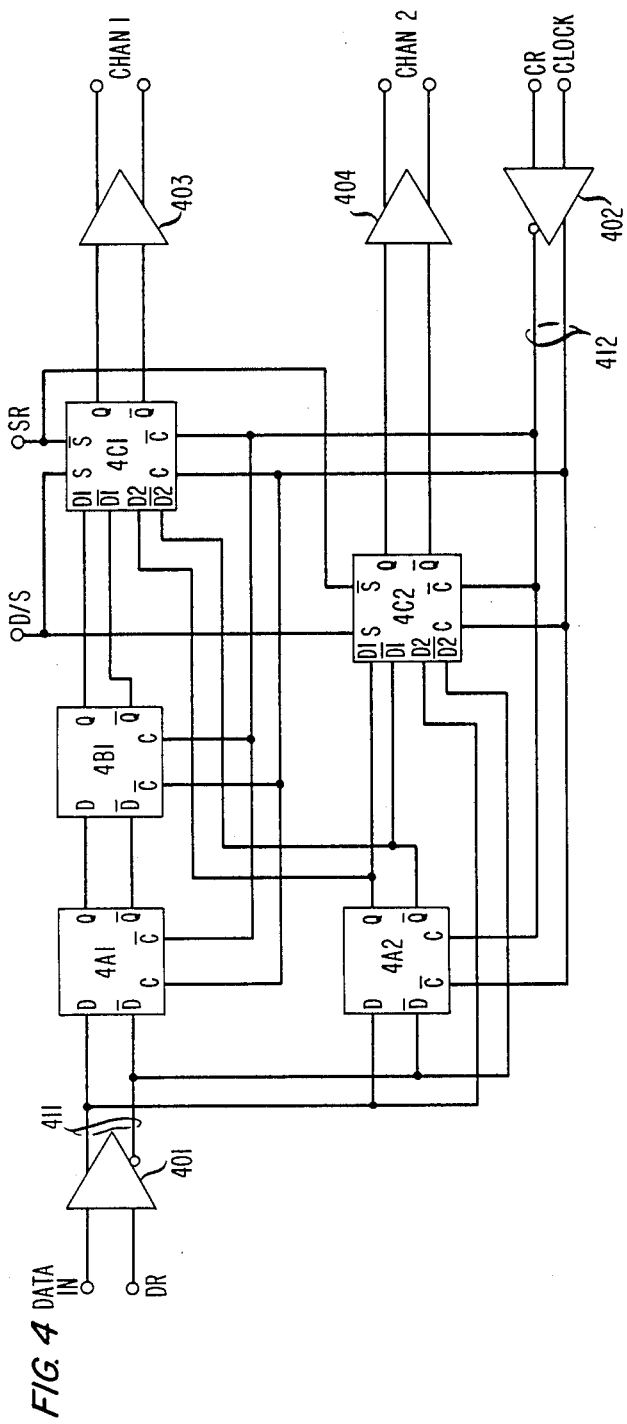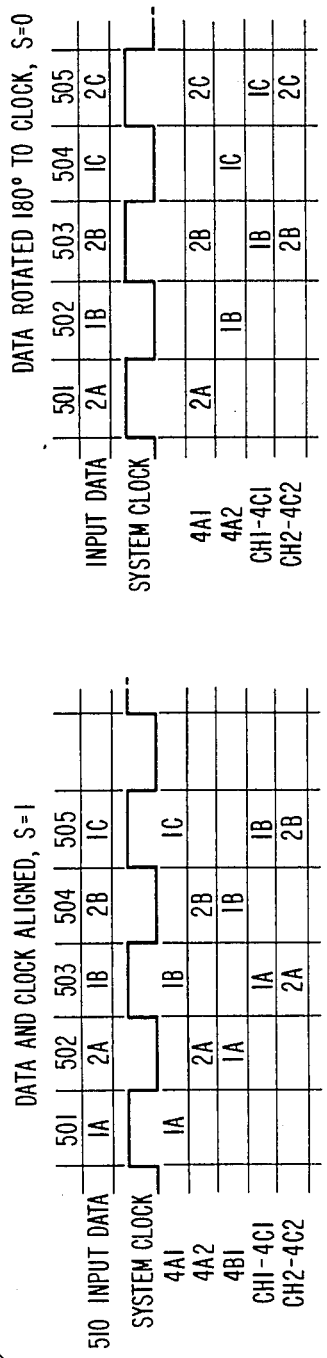
FIG. 4
FIG. 5

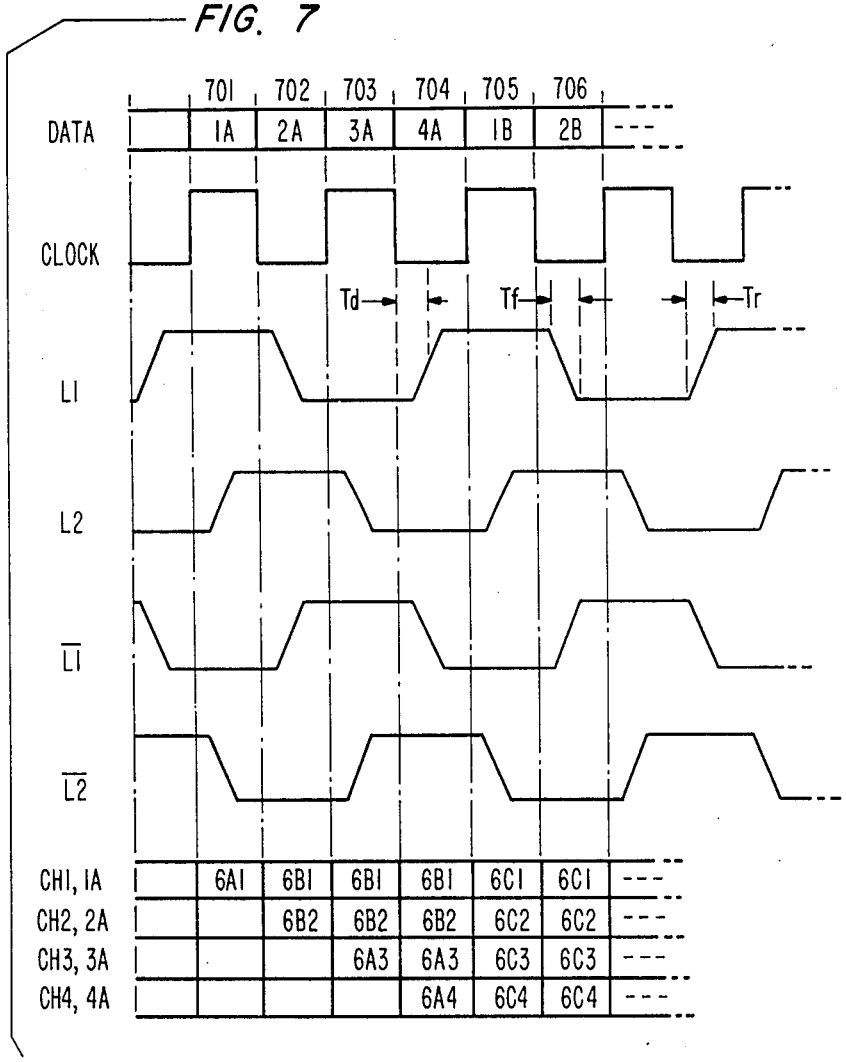

HIGH-SPEED DEMULTIPLEXER CIRCUIT

RELATED APPLICATION

Related subject matter is disclosed in the following application filed concurrently herewith and assigned to the same Assignee hereof: U.S. patent application Ser. No. 109,122 entitled "A High-Speed Multiplexer Circuit", inventor R. G. Swartz.

TECHNICAL FIELD

This invention relates to high-speed digital circuits and more particularly to high-speed digital demultiplexer circuits.

BACKGROUND OF THE INVENTION

To exploit the high data transmission rate of optical fibers, new circuit technologies and architectures are evolving. To enable digital communication systems to operate at these higher data rates requires that multiplexers (MUX) and demultiplexers (DEMUX) operate in the several giga-bits-per-second (Gb/s) range. To achieve the optimum data speed, circuits must operate at the maximum NRZ (non-return-to-zero) data rate possible for the particular technology.

The most effective and practical utilization of a DEMUX circuit in a communication system requires that no more than one adjustable delay line be utilized. The DEMUX should also include provisions for data framing, i.e., data shifting in time and space as needed to align data with the proper output channel and time slot. Moreover, this data-framing adjustment should be accomplished in a timeframe comparable to the bit period ("real-time"). Prior art DEMUX designs have failed to meet all of the above objectives.

SUMMARY OF THE INVENTION

A DEMUX design in accordance with the present invention operates in a fully synchronous manner using a multiphase internal system clock having a frequency equal to the channel output data rate. More particularly, the present 1:M (where M is an integer equal to or greater than 4) DEMUX circuit generates an internal clock signal having M phases at a frequency equal to an input data rate divided by M. The DEMUX circuit also includes M sequencing circuits for decoding the multiplexed data signal into M data channels, each sequencing circuit being clocked by a unique combination of the internal system clock signals to select one data channel from the multiplexed data signal. In a more preferred embodiment, M is equal to $2^N$, where N is an integer equal to or greater than 2.

In accordance with another aspect of the present invention, a clock phase shifting circuit connected to the output of the clock generator circuit rotates the phase of each of the M system clock phases by a predetermined number of phases in response to a control signal. The clock phase shifting circuit provides a real-time data-framing capability for the DEMUX to assure that the input data can be correctly mapped to the proper output channels.

An alternative data-framing capability is provided by the present invention using a data channel shifting circuit for each sequencer circuit for changing the data channel selected by a sequencer circuit in response to a second control signal.

In another embodiment of the present invention, a 1:2 DEMUX circuit includes two sequencer means for decoding a multiplexed input data signal into two channels. Each sequencer is clocked by a different phase of a two-phase system clock operating at one-half of the input data signal rate. Two channel shifters, each included in the sequencer, enable an exchanging of the data channels in response to a control signal.

BRIEF DESCRIPTION OF THE DRAWING

In the drawing,

FIG. 4 shows an illustrative embodiment of a 1:2 DEMUX circuit in accordance with the present invention;

FIG. 5 shows in 500 the timing of input data, system clock and various stages of the DEMUX of FIG. 4 during a property demultiplexed input data signal and in 520 shows the timing during a misalignment of the demultiplexing operation;

FIG. 7 shows the timing between the input data, system clock signal and multiple phased internal clock signals.

GENERAL DESCRIPTION

In accordance with the present invention, a DEMUX architecture is disclosed that operates at the highest data rate possible for a given circuit technology while satisfying several design constraints. These design constraints are summarized as in the following sentences. Firstly, circuits must operate at the maximum serial input NRZ data rate possible within the limits of a particular technology. This data rate is defined to be 1/Td, where Td is the time delay of a single gate under appropriate loading conditions (typically with a fanout of 3 to 4). For example, a technology with a loaded gate delay of 100ps is required to be internally capable of NRZ operation at 10 Gb/s.

Secondly, circuits must function without the need for multiple adjustable delay lines. No more than one variable delay line is permitted (one delay line is used to initially synchronize the external clock and data). Thirdly, the DEMUX must include provision for data framing; i.e., data shifting in time and space as needed to align data with the proper output channel and time slot. Fourthly, the DEMUX must present all output channel data simultaneously at the outputs. This requirement implies that staggering of output data is not permitted for the DEMUX.

The above requirements provide maximum benefit in communication system applications, where the highest operating speed possible is of paramount concern and yet numerous user manual adjustments must be avoided because of expense and reliability issues.

The first requirement of maximum operating speed is realized in the present invention by eliminating unclocked logic, utilizing "biphase" architectures, and employing the ECL (emitter coupled logic) latch configurations, including a "data latch" and a "muxlatch", to accomplish the required logic functions.

The present design avoids unclocked logic by synchronizing all circuits utilized in the DEMUX using a system clock, i.e., there is no intervening unclocked logic between adjacent clocked logic stages.

Figure 1:
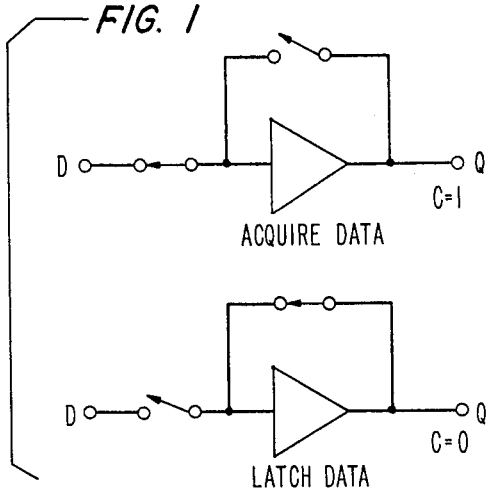
FIG. 1 shows a symbolic latch useful in understanding basic latch operations.

To approximately double the operating speed over conventional approaches, the so-called "biphase" circuit approach is used. A symbolic illustration of a conventional ECL (emitter coupled logic) latch as shown in FIG. 1 operates in two modes: acquire and latch. In the acquire mode (clock=1), the latch operates as a simple differential amplifier, transferring the data from the input D to the output Q. In this mode of operation, the latch senses the input data value (1 or 0). In the latch mode (clock=0), the output Q stabilizes at some particular logic level, the latch being internally disconnected from the data input. The particular mode of operation is determined by the phase of the clock (1 or 0 at a particular time), and the particular logic level at which the output stabilizes is determined by the input data level present when the clock transitions between the acquire (C=1) and latch (C=0) modes.

Thus, for one-half of the clock cycle (i.e., C=0), the data input is ignored in the conventional approach. The biphase architecture utilizes this otherwise wasted time by using two or more latches operating in parallel so that while one latch is acquiring, another parallel circuit is latching. Thus the data is being sampled at all times by one or another circuit, and there is no wasted time. The data throughput effectively doubles. One characteristic of using the biphase circuit approach is that the clocking frequency is equal to one-half the data throughput rate.

Figure 2:
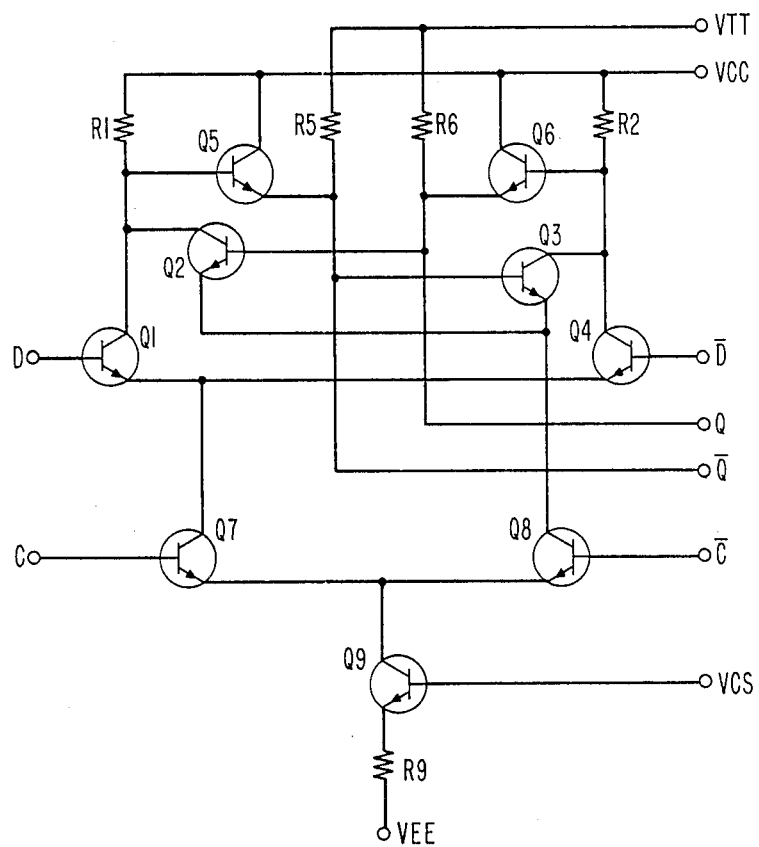
FIG. 2 shows a data latch (D-latch) which is one of the building blocks used in the present invention.

The ECL latch, and variations referred to herein as the muxlatch (M-latch) and the data latch (D-latch), are the basic building blocks utilized in the disclosed DEMUX architecture. The D-latch shown in FIG. 2 is the same as the standard ECL latch. The M-latch shown in FIG. 3 consists of an ECL latch with an added level of series gating. With this added series gating (QS1, QS2), the M-latch (FIG. 3) functions as a clocked 2:1 multiplexer with data selection controlled by "select" inputs (S, $\overline{S}$). The operation of the D- and M-latches will be described in more detail in a later paragraph. The D- and M-latch configurations introduce only a single gate delay (Td) between logic input and output.

We note that other logic configurations implemented in silicon bipolar or FET technology (e.g., "CML" current mode logic), as well as non-silicon technologies (e.g., GaAs FET and bipolar) can have similar single-gate-delay characteristics, and are well-suited for the architectures disclosed here. Such other logic configurations and technologies will have differing values for the loaded gate delay, and the ECL configurations described here are only exemplary implementations.

Circuit configurations utilizing multiple-gate-delay logic will also benefit from the architectures disclosed here, although such logic will not yield the best performance in comparison with single-gate-delay logic.

Regarding the second constraint, in the prior art the need for multiple adjustable delay lines within a DEMUX circuit arose because of the conventional design practice of utilizing different frequency clocks for different parts of the circuit. This results in a need for delay lines to synchronize these clocks. The use of different frequency clocks is understandable since, in a DEMUX configuration, the input and output data rates are different.

The present invention synchronizes all parts of the DEMUX circuit by using the same system clock frequency, chosen to be equal to the output data rate. By using only a single clock frequency for the entire circuit, all elements of the circuit are inherently synchronized, and any need for additional adjustable delays is circumvented.

Data staggering is required within the DEMUX to provide certain required circuit functions. This is accomplished by introducing multiple phases of the system clock. The number of the phases is equal to the order (i.e., number of channels) of the DEMUX (for example, 1:4 DEMUX will have four clock phases). Two useful phases are automatically provided in a biphase circuit: the clock and its inverse. In a differential logic configuration such as ECL, the inverse output is always available, and both clock phases are fully synchronous and undelayed.

The phase spacing is 360/M degrees where M is the order of the DEMUX. Thus in a 1:4 DEMUX, M is 4 and the four clock phases have a 90 degree phase spacing. For M>2, additional phases are produced using conventional synchronous divider circuits (master/slave flipflops).

The DEMUX is clocked internally at a frequency equal to the output data rate. M different clock phases are employed, and phasing between interconnected latches are arranged so that the succeeding latch is always in an acquire mode at least one gate delay longer than its preceding latch. Alternatively stated, clocking of succeeding latches must be phase delayed relative to preceding latches by an amount corresponding in time to at least one gate delay. This phase delay must not, however, exceed 180 degrees by more than one gate delay for it would then transform into a phase advance, rather than delay.

The third requirement—data framing—is accomplished in the DEMUX, again by phase shifting the clocking signal. Rather than attempting to physically shift the data from one output channel to another, it is only necessary to alter the phase relationship of the clock and the data. For an Mth order DEMUX, with M clock phases, incremental advance of the clock phase for each latch within the circuit in steps of 360/M degrees will advance the data channels sideways through adjacent output ports. Some data will be sacrificed while the realignment is taking place, but such data rotation is infrequently required, usually only during the system setup periods, and is acceptable. Note, in one embodiment a combination of physical realignment of data channels (6C1–6C4 of FIG. 6) and of clock phase shifting (6C1–6C2 of FIG. 6) may be employed using M-latches.

Finally, the fourth requirement is met by including additional time delay latches as needed into the data path so that data is acquired at the input(s) at the proper time and shifted to the output(s) at the proper time, with output simultaneity provided as required.

DETAILED DESCRIPTION

With reference to FIG. 2, the operation of a data latch (D-latch) is described. The D-latch is a fully differential, ECL circuit with complementary clock (C and $\overline{C}$), data inputs (D and $\overline{D}$), and buffered outputs (Q, $\overline{Q}$).

The circuit comprising R1, Q5 and R5 when biased by VTT and VCC provides an emitter follower coupling circuit between the collector node of transistors Q1 and Q2 and the base of transistor Q3. Similarly, R2, Q6 and R6 when biased by VTT and VCC provide an emitter follower coupling circuit between the collector node of transistors Q4 and Q3 and the base of transistor Q2. R1 and R2 are the gain setting resistors, and R5 and R6 act as pull-down resistors to bias emitter follower buffers Q5 and Q6. VTT is an optional supply intended to reduce total power dissipation, with VEE<VTT<VCC. Transistor Q9 and resistor R9 when biased by VCS and VEE provide a bias current source to the latch.

When the clock is high (C=1, $\overline{C}$=0), transistor Q7 is on, thus enabling differential pair Q1 and Q4. This is the "acquire" phase; the Q and $\overline{Q}$ outputs assume the value of the D and $\overline{D}$ inputs, respectively. When the clock input goes low (C=0, $\overline{C}$=1), Q7 turns off, Q8 turns on; thus, Q1 and Q4 are disabled, and differential pair Q2, Q3 are enabled, thus latching the Q and $\overline{Q}$ outputs, isolating them from subsequent changes in the data inputs. The Q and $\overline{Q}$ outputs are stable only during this, the "latch", phase of the clock.

Figure 3:
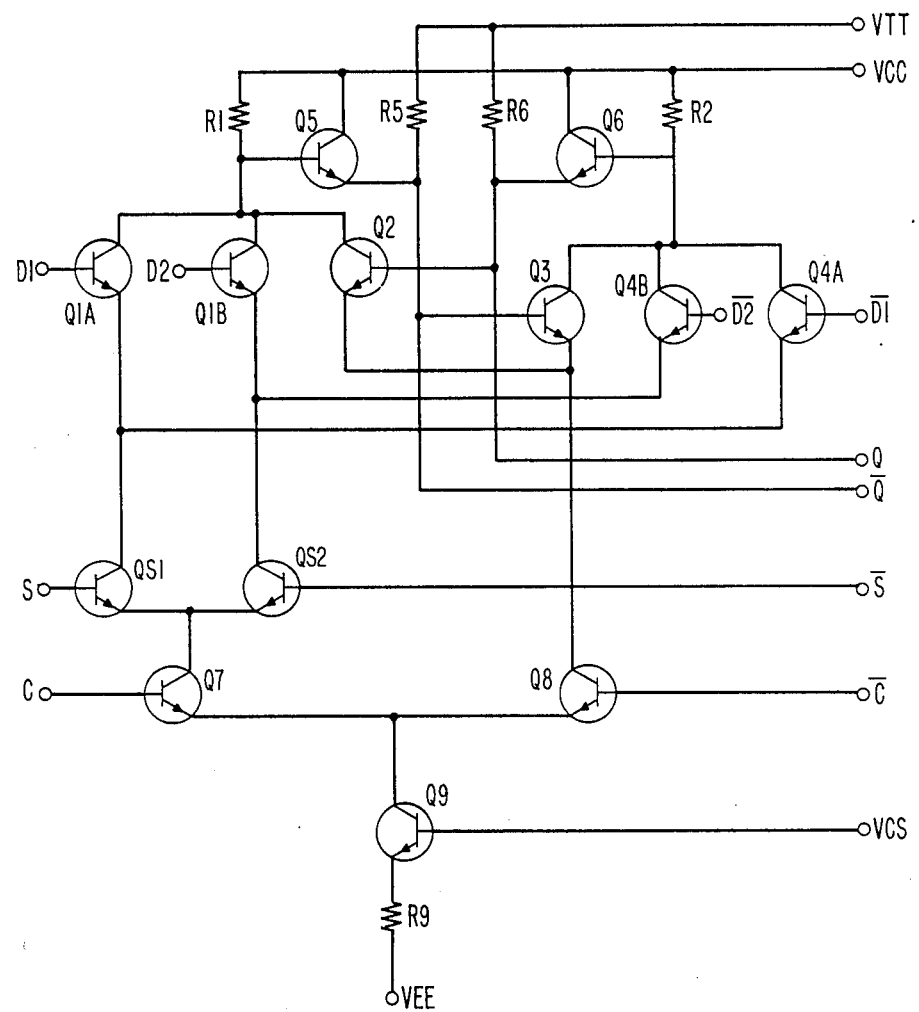
FIG. 3 shows a multiplexer latch (M-latch) which is one of the building blocks used in the present invention.

With reference to FIG. 3, the operation of an M-latch is described. The M-latch is a fully differential, ECL circuit with complementary clock (C and $\overline{C}$), select signal (S and $\overline{S}$), data inputs (D1, D2 and $\overline{D1}$, $\overline{D2}$), and buffered outputs (Q, $\overline{Q}$).

The circuit comprising R1, Q5 and R5 and R2, Q6 and R6 operates in the same manner as previously described. Resistors R1 and R2 are the gain setting resistors, and R5 and R6 act as pull-down resistors to bias emitter follower buffers Q5 and Q6. VTT is an optional supply intended to reduce total power dissipation, with VEE<VTT<VCC. Transistor Q9 and resistor R9 when biased by VCS and VEE provide a bias current source to the latch.

In operation, the select input (S and $\overline{S}$) provides a data selection (MUX) function using transistors QS1 and QS2 for selecting inputs D1, $\overline{D1}$ when S=1, $\overline{S}$=0 and selecting inputs D2, $\overline{D2}$ when S=0, $\overline{S}$=1. When the select signal is high (S=1, $\overline{S}$=0) and clock is high (C=1, $\overline{C}$=0), transistors Q7, QS1 are on, thus enabling differential pair Q1A and Q4A. This is an "acquire" D1 phase; the Q and $\overline{Q}$ outputs assume the value of the D1 and $\overline{D1}$ inputs, respectively. When the clock input goes low (C=0, $\overline{C}$=1), Q1A and Q4A are disabled, and differential pair Q2, Q3 are enabled, thus latching the Q and $\overline{Q}$ outputs, isolating them from subsequent changes in the data inputs. The Q and $\overline{Q}$ outputs are stable only during this, the "latch", phase of the clock.

Similarly, when select signal is low (S=0, $\overline{S}$=1) and clock is high (C=1, $\overline{C}$=0), transistors Q7, QS2 are on, thus enabling differential pair Q1B and Q4B. This is the D2 acquire phase when the Q and $\overline{Q}$ outputs assume the value of the D2 and $\overline{D2}$ inputs, respectively. When the clock goes low (C=0, $\overline{C}$=1), Q1B and Q4B are disabled, and differential pair Q2, Q3 are enabled, thus latching the Q and $\overline{Q}$ outputs.

With reference to FIG. 4 and 500 of FIG. 5, the operation of a 1:2 DEMUX is described in accordance with the present invention. Buffer 401 receives a single polarity input data signal (DATA IN) received from other apparatus and converts it into a differential input data signal 411 using threshold signal DR. Obviously, if required, buffer 401 may provide other signal conditioning functions (e.g., filtering, level shifting, etc.) to the input signal. Buffer 402 converts a single polarity clock signal into a differential system clock signal 412. Buffers 403 and 404 buffer the 1:2 DEMUX outputs, respectively, for channel A and channel B. Buffers 403 and 404 may also provide other signal conditioning to enable the DEMUX to interface to external apparatus. The select SR lead and delay/shift lead D/S, as will be described in a later paragraph, enable data framing for the 1:2 DEMUX. Latches 4A1, 4A2 and 4B1 are D-latches while 4C1 and 4C2 are M-latches. Latches 4A1 and 4A2 are clocked on opposing phases of the system clock 412. Thus, as shown at time slot 501 in 510 of FIG. 5, latch 4A1 acquires input data bit 1A during one phase of the system clock signal and latches the input data during phase 502. Meanwhile, latch 4A2 acquires input data 2A during the second phase of the system clock signal 502 and latches the input data during phase 503. Thus, latches 4A1 and 4A2 continuously load alternate bits of serial input data 510.

Latch 4B1 delays the channel 1 datta by one bit period so that channel 1 and channel 2 data arrive at latches 4C1 and 4C2, respectively, at the same time. This occurs at time slot 502 when latch 4B1 acquires data 1A from latch 4A1 during the same clock phase as latch 4A2 acquires data 2A, thereby providing a one-bit delay period for channel 1 data. If the select inputs to latches 4C1 and 4C2 are externally set high (S=1, $\overline{S}$=0) by leads D/S and SR, then the D1 inputs are active, and normal serial data transfer occurs. Thus, as shown at time 503, the outputs 1A, 2A from latches 4C1 and 4C2, i.e., channel 1 and channel 2 outputs, are concurrent.

Continuing, during time slot 503 latch 4A1 acquires input data bit 1B. In time slot 504, latch 4A2 acquires input data bit 2B while latch 4B1 acquires bit 1B from latch 4A1. In time slot 505, latches 4C1 and 4C2 acquire output bits 1B and 2B, respectively, and latch 4A1 acquires bit 1C. This process continues with the odd bits from input data stream 510 becoming channel 1 output and the even bits becoming channel 2 output. Note also that the system clock rate is equal to the output data rate (i.e., input data rate divided by M).

In the above example, we assumed that channel 1 and channel 2 data had been properly demultiplexed from the input data. In the above example, a data misalignment occurs when channel 1 outpus even bits and channel 2 outputs odd bits. When a data misalignment exists, then the channel 2 data appears at the output of 403 and channel 1 data for the subsequent word is routed to 404. Moreover, not only are data channels switched, but words are broken incorrectly so that instead of an output (1a,2a), (1b,2b), (1c,2c) etc. (representing successive bits a,b,c, outputted concurrently at channels 1 and 2, etc.), the output sequence is (2a,1b), (2b,1c), etc. This data misalignment sequence is remedied by the present invention by externally applying a logic zero (S=0, $\overline{S}$=1) to the select inputs (S, $\overline{S}$) of latches 4C1 and 4C2. This results in the D2 inputs (D2, $\overline{D2}$) of 4C1 and 4C2 being active, thus cross-connecting the data channels so that outputs are reversed and resynchronized. The result is that channel 1 and channel 2 connections are reversed so that they correctly and concurrently output the same bits of their respective words. See 520 of FIG. 5 for a graphical representation of the circuit timing in this situation.

Figure 6:
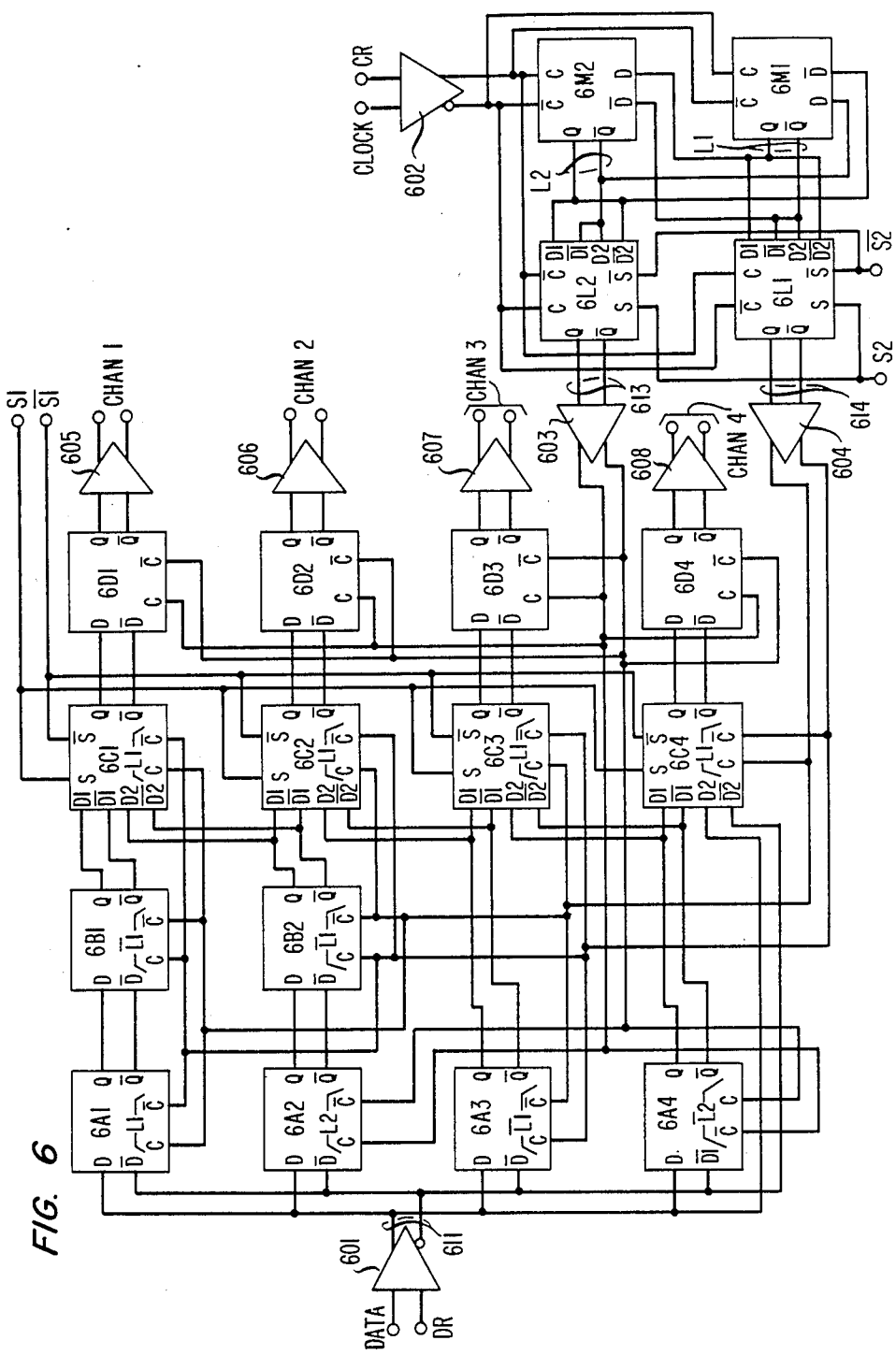
FIG. 6 shows an illustrative embodiment of a 1:4 DEMUX circuit in accordance with the present invention.

With reference to FIGS. 6 and 7, the operation of a 1:4 DEMUX is described in accordance with the present invention. Using the modularity of the present design, a 1:4 DEMUX is implemented basically from two 1:2 DEMUXs with an additional multiphase select clock. Where possible, circuit optimization has resulted in the elimination of unneeded latches, thereby minimizing circuit count.

Before embarking on the detailed circuit description, we note that latches 6A1, 6B1, 6C1, 6A3 and 6C3 constitute a 1:2 demultiplexer similar in configuration to that in FIG. 4. Likewise, latches 6A2, 6B2, 6C2, 6A4 and 6C4 constitute another such demultiplexer. Clocking and data acquisition of the 1:2 demultiplexers is interleaved via the overlapping L1, L2 internal clocking.

Buffer 601 converts a single polarity input data signal (DATA IN) into a differential input data signal 611 using threshold signal DR. Similarly, buffer 602 converts a single polarity clock signal into a differential clock signal 602 using threshold signal CR. Buffer 602 may provide other signal conditioning functions required to interface the 1:4 DEMUX to external apparatus. Buffers 603 and 604 buffer the output of different phases of an internal system clock 613 and 614, respectively. Buffers 605–608 output the differential signals, respectively, for channels 1–4. Buffers 605–608 may also provide other signal conditioning to enable the 1:4 DEMUX to interface to external apparatus.

The latches 6A1–6A4, 6B1, 6B2, 6D1–6D4, 6M1 and 6M2 are D-latches. The latches 6C1–6C4, 6L1 and 6L2 are M-latches.

The shift one bit (S1, $\overline{S1}$) and shift two bit (S2, $\overline{S2}$) signals cause, respectively, a one- and a two-bit delay in the data signal. These signals cause M-latches, 6C1, 6C2, 6C3, 6C4, 6L1 and 6L2 to select either their D1, $\overline{D1}$ or D2, $\overline{D2}$ inputs. These signals enable data reframing of the 1:4 DEMUX and will be described in a later paragraph.

The input clock frequency (clock) is initially divided in half (by latches 6M1 and 6M2) to produce the four-phase system clock L1, L2, $\overline{L1}$, $\overline{L2}$ at half the input frequency, each phase shifted 90 degrees relative to each other. These system clock signals from 6M1 and 6M2 are routed to both the D1 and D2 data inputs of latches 6L1 and 6L2 respectively. Note that the L1 and L2 connections to D2 are inverted relative to those of D1. Thus, for example, when the select inputs of 6L1 and 6L2 are high (i.e., S=1, $\overline{S}$=0), 6L1 and 6L2 acquire, respectively, L1 and L2; but when the select inputs are low (i.e., S=0, $\overline{S}$=1), 6L1 and 6L2 acquire, respectively, $\overline{L1}$ and $\overline{L2}$. As will be discussed in a later paragraph, this capability is utilized for data framing.

The sequencer means for channel 1 comprises latches 6A1, 6B1, and 6D1 and channel shifter 6C1. The sequencer means for channel 2 comprises latches 6A2, 6B2 and 6D2 and channel shifter 6C2. The sequencer means for channel 3 comprises latches 6A3 and 6D3 and channel shifter 6C3. The sequencer means for channel 4 comprises latch 6A4 and 6D4 and channel shifter 6C4.

The data handling latches in the DEMUX are clocked using L1, $\overline{L1}$, L2 or $\overline{L2}$. Thus a quad-phase, overlapping clock is utilized throughout the circuit. The clocking sequence is L1→L2→$\overline{L1}$→$\overline{L2}$ (see FIG. 7). As shown in FIG. 7, because of inherent delay (Td) in latches 6M1 and 6M2, the signals L1, $\overline{L1}$, L2, $\overline{L2}$ are delayed relative to the external clock signal. This delay is irrelevant to internal circuit operation, however. Additionally, the signals L1, $\overline{L1}$, L2, $\overline{L2}$ all exhibit rise times Tr and fall times Tf, which are illustratively assumed to be equal. In order to guarantee proper data acquisition, the present invention carefully utilizes the clocking sequences when serially connected latches are not clocked with 180 degrees phase-referenced clocks. For example, an $\overline{L1}$-clocked latch must not follow immediately an $\overline{L2}$-clocked latch.

Circuit operation of FIG. 6 is described as follows and includes reference to FIG. 7.

Latch 6A1 is clocked with L1, latch 6A2 is clocked with L2, latch 6A3 with $\overline{L1}$, and latch 6A4 with $\overline{L2}$. Thus data are sequentially acquired and latched into each of the input registers from the input data stream. Note from FIG. 7 that for each latch, the acquisition pulse width (e.g., L1) is one full clock period or two data bits wide. This means that each latch 6A1–6A4 will sequentially acquire two data bits, but only the second bit is latched.

Also, latches 6B1 and 6B2 are clocked with $\overline{L1}$. Latches 6C1–6C4 are clocked with L1. Latches 6D1–6D4 are clocked with either $\overline{L1}$ or L2. In FIG. 6, latches 6D1–6D4 are shown with L2 clocking in order to balance system clock line loading between L1 and L2.

The following is a step-by-step account of the circuit logic sequence of FIG. 6 and references FIG. 7. FIG. 7 also shows, illustratively, how the first bit of channels 1–4, i.e., 1A–4A, sequences through the various stages:

Time interval 701: Assume that initially both L1 and L2 are high.
  6A1 acquires the new channel 1 bit (1A).
  6A2 also acquires the channel 1 bit (1A).
Time interval 702: L1 goes low and L2 stays high.
  6A1 latches the channel 1 bit (1A).
  6A2 acquires the channel 2 bit (2A).
  6A3 acquires the channel 2 bit (2A).
  6B1 acquires the channel 1 bit (1A) from 6A1.
  6B2 acquires from 6A2 bit (2A) which is itself still in the acquire phase. The output of 6B2 is uncertain.
Time interval 703: L1 stays low and L2 goes low.
  6A1 holds the channel 1 bit (1A).
  6A2 latches the channel 2 bit (2A).
  6A3 acquires the channel 3 bit (3A).
  6A4 acquires the channel 3 bit (3A).
  6B1 continues to acquire 6A1.
  6B2 acquires the channel 2 bit (2A).
Time interval 704: L1 goes high and L2 stays low.
  6A2 holds the channel 2 bit (2A).
  6A3 latches the channel 3 bit (3A).
  6A4 acquires the channel 4 bit (4A).
  6B1 latches the channel 1 bit (1A).
  6B2 latches the channel 2 bit (2A).
  6C1 acquires the channel 1 bit (1A).
  6C2 acquires the channel 2 bit (2A).
  6C3 acquires the channel 3 bit (3A).
  6C4 acquires 6A4 which is itself still in the acquire phase. The state of 6C4 is thus uncertain.
Time interval 705: L1 stays high and L2 goes low.
  6A3 holds the channel 3 bit (3A).
  6A4 latches the channel 4 bit (4A).
  6B1 holds the channel 1 bit (1A).
  6B2 holds the channel 2 bit (2A).
  6C1–6C4 acquire the channel 1–channel 4 bits (1A,-2A,3A,4A), respectively.
  Note, latches 6A1 and 6A2 acquire new channel 1 bit (1B) in the manner described in time interval 701.
Time interval 706: L1 goes low and L2 stays high.
  6C1–6C4 latch simultaneously the channel 1–channel 4 bits, respectively.
  Note, latches 6A1, 6A2, 6B1, and 6B2 functions as illustrated in time interval 702, described previously, except that bits 1B and 2B for channel 1 and 2, respectively, are appropriately acquired or latched.

The sequence is completed when L1 goes high again, or L2 goes low, depending on how 6D1-6D4 are clocked, and the demultiplexed data is routed to the outputs. This final column of latches are required because as noted in time interval 704 above, 6C4 will briefly acquire an incorrect state. It will always latch to the correct state, however, so the 6D1-6D4 latches eliminate this problem.

With reference to FIG. 6, data framing is discussed. Data framing is handled using a 2-bit framing signal. Data may be advanced one bit or delayed three bits relative to the clock by externally setting low the select inputs for 6C1-6C4 (S1=0, $\overline{S1}$=1). This changes the connections so that 6C1 reads 6B2, 6C2 reads 6A3, 6C3 reads 6A4, and 6C4 reads the input data directly.

If it is necessary to advance or delay the data two bits relative to the clock, then the select inputs of 6L1 and 6L2 are set low (S2=0, $\overline{S2}$=1). This causes an inversion of the L1, L2 clocking signals, resulting in a two-bit shift.

Finally, if the data must be advanced three bits or delayed one bit relative to the clock, then both framing lines (the select inputs for 6C1-6C4 and 6L1-6L2) are set low (S1=S2=0, $\overline{S1}$=$\overline{S2}$=1).

While a 1:$2^N$ DEMUX, with N equal to 2, has been described in FIGS. 6 and 7, it should be apparent that the disclosed techniques can be used to implement a DEMUX having N greater than 2. More generally, the DEMUX can implement a 1:M DEMUX where M is any integer. Such an arrangement requires an M phase system clock operating at a frequency equal to 1/M of the input data rate and M sequencer means for decoding the input signal into M channels, each sequencer using a unique combination of said M phase system clock to select the desired data channel.

The above described latches and buffers may be designed using any well-known integrated bipolar or FET circuit technologies or using the more sophisticated technologies such as gallium arsenide (GaAs) FET, bipolar, or super self-aligned silicon bipolar.

What has been described is merely illustrative of the application of the principles of the present invention. Other methods and circuits can be implemented by those skilled in the art without departing from the spirit and scope of the present invention.

What is claimed is:

1. A 1:M demultiplexer apparatus, where M is an integer equal to or greater than 4, for demultiplexing a multiplexed data signal into M data channels, said demultiplexer apparatus comprising:
   means for generating M phase system clock signals at a frequency which is equal to the input data signal rate divided by M; and
   M sequencer means for decoding said multiplexed data signal into M data channels, each of said M sequencer means being clocked by a different combination of said M phase system clock signals to select one data channel from said multiplexed data signal.

2. The demultiplexer apparatus of claim 1 further comprising:
   clock phase shifter means connected to said generator means for shifting the phase of each of said M clock phase signals outputted to said sequencer means by a fixed number of clock phases in response to a control signal received by said phase shifter means and wherein said phase shifter means changes the channel of data selectd from said multiplexed data stream by each of said sequener means by said fixed number.

3. The demultiplexer apparatus of claim 1 including:
   M channel shifter means, each associated with one of said sequencer means, for changing the channel of data selected by each of said sequencer means in response to a second control signal.

4. A 1:$2^N$ (where N is an integer $\geq$2) demultiplexer apparatus for demultiplexing a multiplexed digital input data signal into $2^N$ channels, said demultiplexer apparatus comprising:
   means for generating system clock signals having $2^N$ phases at a frequency which is equal to an input data signal rate divided by $2^N$; and
   $2^N$ sequence means for decoding said input data signal into $2^N$ data channels, each of said $2^N$ sequencer means being clocked by a different combination of said $2^N$ phase system clock signals to select one data channel from said input data signal.

5. The demultiplexer apparatus of claim 4 further comprising:
   clock phase shifter means connected to said generator means for shifting the phase of said $2^N$ clock phase signals by a fixed number of phases in response to a control signal and wherein said phase shifter means changes the channel of data selected from said input data signal by each of said sequencer means by said fixed number.

6. The demultiplexer apparatus of claim 5 including:
   $2^N$ channel shifter means, each included in a different one of said sequencer means, for changing the channel of data selected by each of said sequencer means in response to a second control signal.

7. The demultiplexer apparatus of claim 6 wherein each of said sequencer means includes a plurality of latch means.

8. The demultiplexer apparatus of claim 4 further including:
   means for receiving a data signal from an external data source and conditioning said received data signal into said input data signal, and
   $2^N$ transmitting means, each associated with a respective one of said $2^N$ sequencer means for conditioning data channel signals for output therefrom.

9. A 1:2 demultiplexer apparatus for demultiplexing a multiplexed digital input data signal into two channels, said demultiplexer apparatus comprising:
   means for generating a system clock having two phases at a frequency which is equal to one-half of the rate of the input data signal;
   two sequencer means for decoding said multiplexed data signal into two data channels, each of said two sequencer means being clocked by a different phase of said system clock to select one data channel from said multiplexed data signal;
   two channel shifter means, each associated with one of said sequencer means, for changing the channel of data selected by each of said sequencer means in response to a control signal.

* * * * *